(12) United States Patent
Chien et al.

(10) Patent No.: US 11,128,149 B2
(45) Date of Patent: Sep. 21, 2021

(54) CHARGING APPARATUS

(71) Applicant: Merry Electronics(Shenzhen) Co., Ltd., ShenZhen (CN)

(72) Inventors: Po-Chia Chien, Taichung (TW); Chi-Yin Lo, Taichung (TW); Yung-Hsiang Liu, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 122 days.

(21) Appl. No.: 16/786,990

(22) Filed: Feb. 10, 2020

(65) Prior Publication Data

US 2021/0050735 A1     Feb. 18, 2021

Related U.S. Application Data

(60) Provisional application No. 62/886,306, filed on Aug. 13, 2019.

(30) Foreign Application Priority Data

Dec. 25, 2019  (TW) .................................. 108147617

(51) Int. Cl.
*H02J 7/00*      (2006.01)

(52) U.S. Cl.
CPC ...... *H02J 7/00041* (2020.01); *H02J 7/00302* (2020.01); *H02J 7/007182* (2020.01)

(58) Field of Classification Search
USPC ....................................................... 320/132
See application file for complete search history.

(56) References Cited

U.S. PATENT DOCUMENTS

| | | | |
|---|---|---|---|
| 2011/0025257 A1* | 2/2011 | Weng ...................... | H02J 7/342 320/103 |
| 2013/0026974 A1* | 1/2013 | Huang .............. | H02J 7/007182 320/107 |
| 2015/0229153 A1* | 8/2015 | Kung ........................ | H02J 7/00 320/162 |
| 2018/0166910 A1* | 6/2018 | Sun .......................... | H02J 7/345 |
| 2019/0386493 A1* | 12/2019 | Li .......................... | H04R 1/1025 |

\* cited by examiner

*Primary Examiner* — Samuel Berhanu
(74) *Attorney, Agent, or Firm* — JCIPRNET

(57) ABSTRACT

A charging apparatus is provided. A detection circuit includes a voltage dividing path between an output terminal of a charging circuit and an output terminal of a reference voltage generating circuit. The detection circuit provides a detection signal according to a divided voltage on the voltage dividing path. A control circuit determines whether a load is connected to the charging apparatus according to the detection signal.

10 Claims, 5 Drawing Sheets

CHARGING APPARATUS

CROSS-REFERENCE TO RELATED APPLICATION

This application claims the priority benefits of U.S. provisional application Ser. No. 62/886,306, filed on Aug. 13, 2019, and Taiwan application serial no. 108147617, filed on Dec. 25, 2019. The entirety of each of the above-mentioned patent applications is hereby incorporated by reference herein and made a part of this specification.

BACKGROUND

Technical Field

The disclosure relates to an electronic apparatus, and particularly relates to a charging apparatus.

Description of Related Art

Power of a portable electronic device is usually provided by a rechargeable power storage device, so that a service time of the portable electronic device depends on a power storage capacity of the rechargeable power storage device. In addition, the rechargeable power storage device must be equipped with a charging apparatus in use. The charging apparatus may not only increase the power of the rechargeable power storage device timely, but may also detect whether the portable electronic device is connected to the rechargeable power storage device and determine whether it is necessary to charge the portable electronic device.

The conventional charging apparatus may use, for example, Hall sensing, design of a mechanical switch, or use a pogo pin to detect the connection of the portable electronic device and determine whether to charge the portable electronic device, but these methods have disadvantages of excessive volume, high cost, easy damage to a mechanical structure, poor waterproof and dustproof effects, the need to add pins, etc.

SUMMARY

The disclosure is directed to a charging apparatus, which is adapted to mitigate the disadvantages of excessive volume, high cost, easy damage to a mechanical structure, poor waterproof and dustproof effects, the need to add pins, etc., of the conventional charging apparatus.

The disclosure provides a charging apparatus including a power supply, a charging circuit, a reference voltage generating circuit, a detection circuit and a control circuit. The charging circuit is coupled to the power supply, and provides a charging voltage according to the power supply. The reference voltage generating circuit is coupled to the power supply, and provides a reference voltage according to the power supply. The detection circuit is coupled to the charging circuit and the reference voltage generating circuit, and the detection circuit includes a voltage dividing path located between an output terminal of the charging circuit and an output terminal of the reference voltage generating circuit. The detection circuit provides a detection signal according to a divided voltage on the voltage dividing path. The control circuit is coupled to the reference voltage generating circuit, the detection circuit and the charging circuit, and determines whether a load is connected to the charging apparatus according to the detection signal and a charging current of the charging circuit.

In an embodiment of the disclosure, the control circuit further determines a charging status of the load according to the charging current of the charging circuit.

In an embodiment of the disclosure, the detection circuit includes a diode, a resistor, a voltage dividing circuit and a comparator. An anode of the diode is coupled to the output terminal of the reference voltage generating circuit. The resistor is coupled between a cathode of the diode and the output terminal of the charging circuit. The voltage dividing circuit is coupled to a common node of the diode and the resistor, and divides a voltage on the common node of the diode and the resistor to generate the divided voltage. A positive input terminal and a negative input terminal of the comparator are respectively coupled to an output terminal of the voltage dividing circuit and the output terminal of the charging circuit, and the comparator compares the divided voltage and the charging voltage to generate the detection signal.

In an embodiment of the disclosure, the voltage dividing circuit includes a first resistor and a second resistor. The second resistor and the first resistor are coupled in series between a ground and the common node of the diode and the resistor, and a common node of the first resistor and the second resistor is coupled to the positive input terminal of the comparator.

In an embodiment of the disclosure, the detection circuit includes a first resistor and a diode. A first terminal of the first resistor is coupled to the reference voltage generating circuit. An anode and a cathode of the diode are respectively coupled to a second terminal of the first resistor and the output terminal of the charging circuit. The load has a second resistor, and a common node of the first resistor and the diode generates the detection signal, where when the load is connected to the charging apparatus, the second resistor is coupled between the cathode of the diode and the ground.

In an embodiment of the disclosure, when the control circuit determines that the load is not connected to the charging apparatus according to the detection signal, the control circuit controls the charging circuit to stop outputting the charging voltage.

In an embodiment of the disclosure, when the control circuit determines that the load is connected to the charging apparatus and the load has not completed charging according to the detection signal and the charging current, the control circuit controls the charging circuit to output the charging voltage to charge the load.

In an embodiment of the disclosure, when the control circuit determines that the load is connected to the charging apparatus and the load has completed charging according to the detection signal and the charging current, the control circuit controls the charging circuit to stop outputting the charging voltage.

In an embodiment of the disclosure, the charging circuit includes a voltage conversion circuit and a current sensing circuit. The voltage conversion circuit is coupled to the control circuit, and converts a voltage provided by the power supply to generate the charging voltage. The current sensing circuit is coupled to the voltage conversion circuit and the control circuit, and senses the charging current, and transmits a sensing result to the control circuit.

In an embodiment of the disclosure, the charging voltage is greater than the reference voltage.

Based on the above description, the detection circuit of the embodiment of the disclosure may provide the detection signal according to the divided voltage on the voltage dividing path between the output terminal of the charging circuit and the output terminal of the reference voltage generating circuit, and the control circuit determines whether the load is connected to the charging apparatus according to the detection signal. In this way, it is unnecessary to use components such as a magnet, a mechanical switch, or an additionally configured pogo pin to detect whether the load is connected to the charging apparatus, so that the disadvantages of the conventional charging apparatus such as excessive volume, high cost, easy damage to the mechanical structure, poor waterproof and dustproof effects and the need to add pins may be mitigated.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
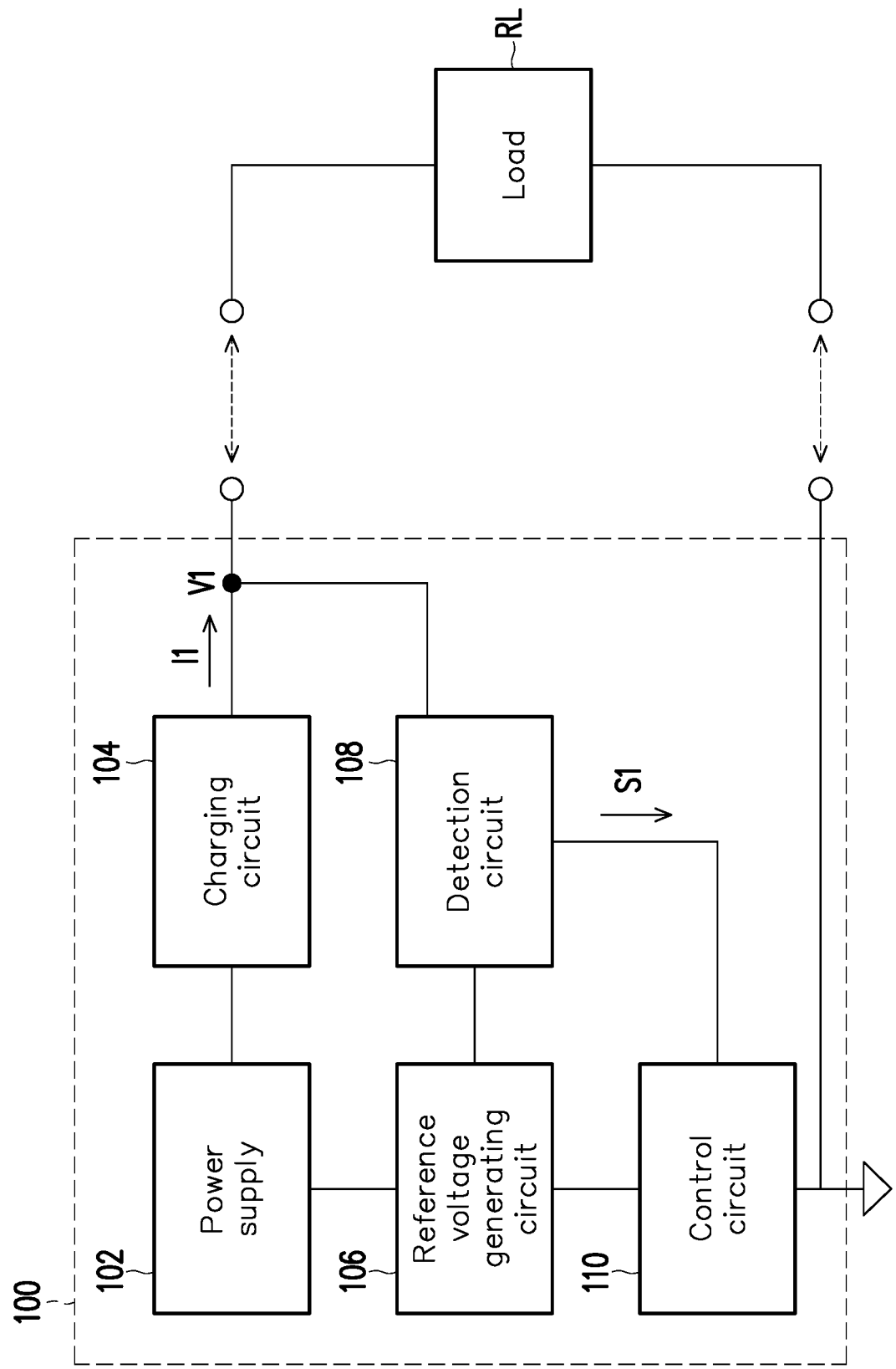
FIG. 1 is a schematic diagram of a charging apparatus according to an embodiment of the disclosure.

FIG. 1 is a schematic diagram of a charging apparatus according to an embodiment of the disclosure. Referring to FIG. 1, the charging apparatus 100 includes a power supply 102, a charging circuit 104, a reference voltage generating circuit 106, a detection circuit 108 and a control circuit 110. The power supply 102 is coupled to the charging circuit 104 and the reference voltage generating circuit 106, the detection circuit 108 is coupled to the reference voltage generating circuit 106 and an output terminal of the charging circuit 104, and the control circuit 110 is coupled to the charging circuit 104, the reference voltage generating circuit 106 and the detection circuit 108. For simplicity's sake, a coupling relationship of the control circuit 110 and the charging circuit 104 is not illustrated in FIG. 1.

The charging circuit 104 may provides a charging voltage V1 according to the power supply 102. The reference voltage generating circuit 106 generates a reference voltage at an output terminal thereof according to the power supply 102. The detection circuit 108 includes a voltage dividing path located between the output terminal of the charging circuit 104 and an output terminal of the reference voltage generating circuit 106. The detection circuit 108 provides a detection signal S1 according to a divided voltage on the voltage dividing path. The control circuit 110 may determine whether a load RL is connected to the charging apparatus 100 according to the detection signal S1, where the load RL is, for example, a portable electronic device such as a wireless earphone, a mobile power supply, a smart bracelet or a smart watch, etc., but the disclosure is not limited thereto. Moreover, the control circuit 110 may further determine a charging status of the load RL according to a charging current I1 of the charging circuit 104, so as to determine whether to charge the load RL.

For example, when the control circuit 110 determines that the load RL is not connected to the charging apparatus 100 according to the detection signal S1, the control circuit 110 may control the charging circuit 104 to stop outputting the charging voltage V1. When the control circuit 110 determines that the load RL is connected to the charging apparatus 100 and the load RL has not completed charging according to the detection signal S1 and the charging current I1 (for example, when the charging current I1 is greater than a predetermined current value, the control circuit 110 may determine that the load RL has not completed charging), the control circuit 110 may control the charging circuit 104 to output the charging voltage V1 to charge the load RL. Moreover, when the control circuit 110 determines that the load RL is connected to the charging apparatus 100 and the load RL has completed charging according to the detection signal S1 and the charging current I1 (for example, when the charging current I1 is smaller than or equal to the predetermined current value, the control circuit 110 may determine that the load RL has completed charging), the control circuit 110 controls the charging circuit 104 to stop outputting the charging voltage V1.

By using the detection circuit 108 to provide the detection signal S1 according to the divided voltage on the voltage dividing path located between the output terminal of the charging circuit 104 and the output terminal of the reference voltage generating circuit 106, and using the control circuit 110 to determine whether the load RL is connected to the charging apparatus 100 according to the detection signal S1 and determine whether to charge the load RL according to the charging current I1 of the charging circuit 104, it is unnecessary to use components such as a magnet, a mechanical switch, or an additionally configured pogo pin, etc., to detect whether the load RL is connected to the charging apparatus 100, so that the disadvantages of the conventional charging apparatus such as excessive volume, high cost, easy damage to the mechanical structure, poor waterproof and dustproof effects and the need to add pins may be mitigated.

Figure 2:
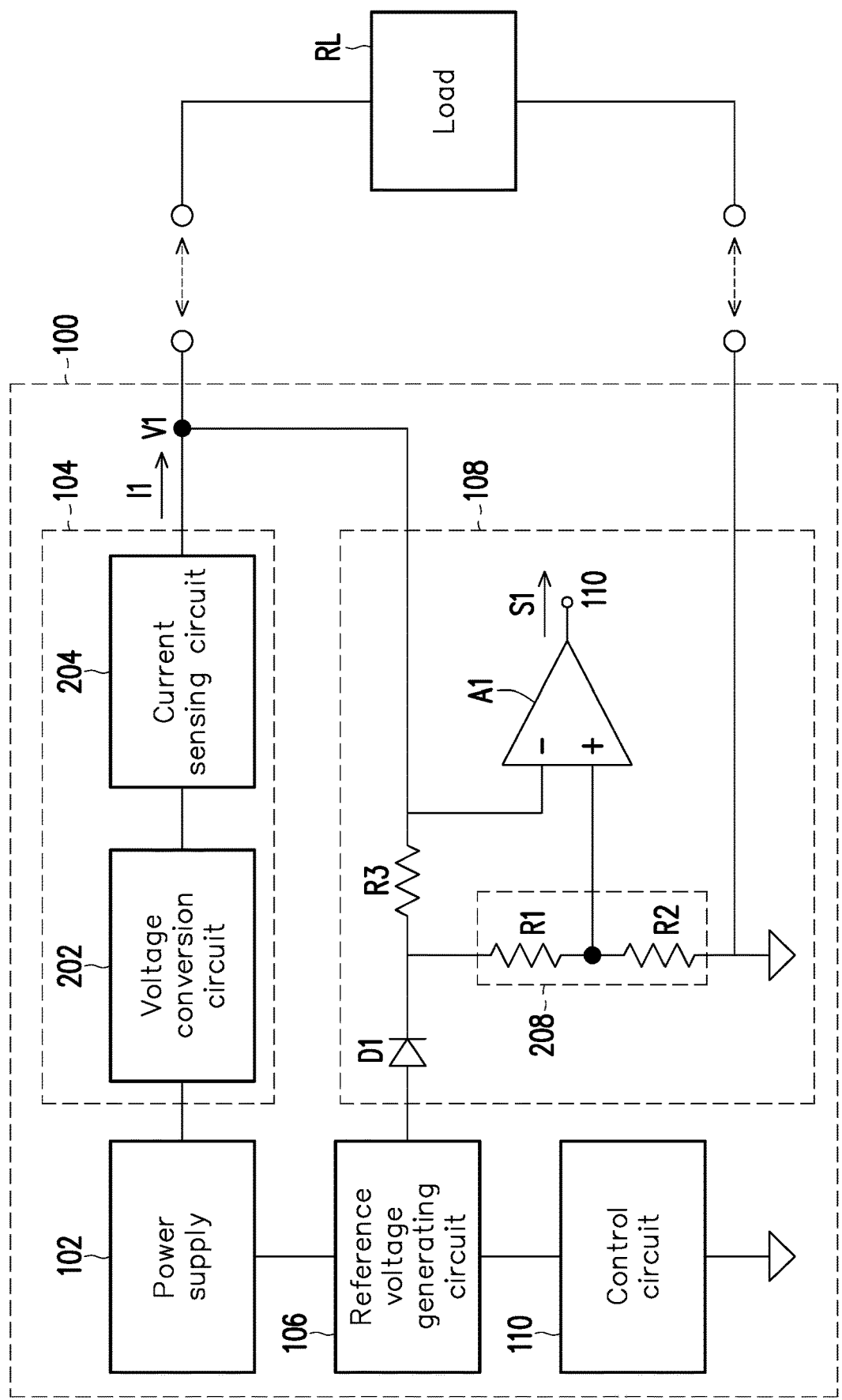
FIG. 2 is a schematic diagram of a charging apparatus according to another embodiment of the disclosure.
Figure 3:
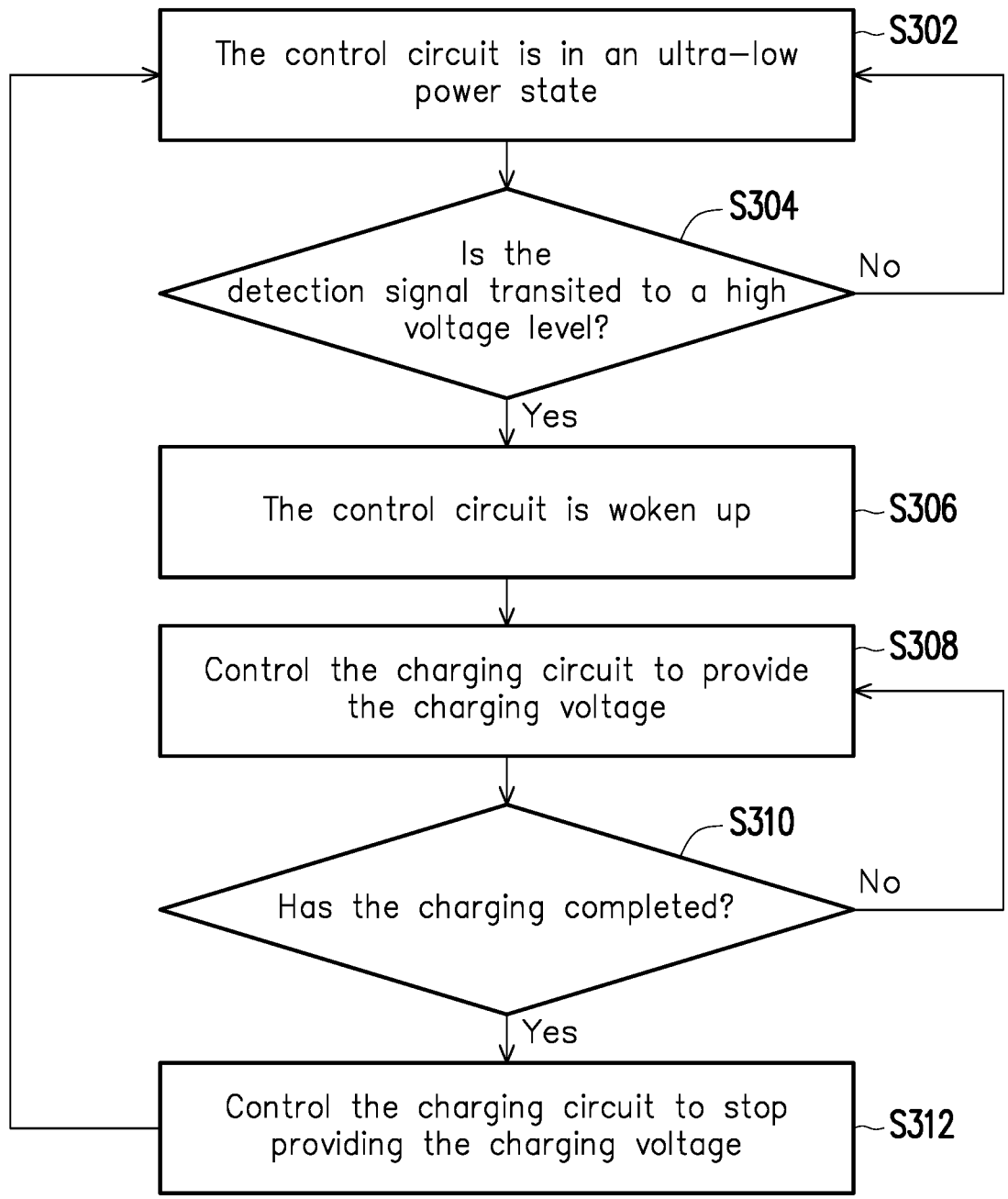
FIG. 3 is a flowchart illustrating charging of the charging apparatus according to an embodiment of the disclosure.

FIG. 2 is a schematic diagram of a charging apparatus according to another embodiment of the disclosure, and FIG. 3 is a flowchart illustrating charging of the charging apparatus according to an embodiment of the disclosure. Referring to FIG. 2 and FIG. 3, in the embodiment of FIG. 2, the charging circuit 104 may include a voltage conversion circuit 202 and a current sensing circuit 204, where the voltage conversion circuit 202 is coupled to power supply 102, the control circuit 110 and the current sensing circuit 204, and the current sensing circuit 204 is further coupled to the control circuit 110. The control circuit 110 may control the voltage conversion circuit 202 to convert a voltage provided by the power supply 102 to generate the charging voltage V1, and the current sensing circuit 204 may sense the charging current I1, and transmit a sensing result to the control circuit 110.

Moreover, the detection circuit 108 may include a diode D1, a voltage dividing circuit 208, a resistor R3 and a comparator A1. In the embodiment, the voltage dividing circuit 208 may include resistors R1 and R2, where an anode and a cathode of the diode D1 are respectively coupled to the output terminal of the reference voltage generating circuit 106 and a first terminal of the resistor R3, a second terminal of the resistor R3 is coupled to the output terminal of the charging circuit 104, and the resistors R1 and R2 are coupled between the cathode of the diode D1 and the ground. A positive input terminal and a negative input terminal of the comparator A1 are respectively coupled to a common node of the resistors R1 and R2 and the second terminal of the resistor R3, and an output terminal of the comparator A1 is coupled to the control circuit 110.

When the load RL is not connected to the charging apparatus 100 (for example, when the wireless earphone is not placed in a charging case (i.e. the charging apparatus 100)), the control circuit 110 is in an ultra-low power state (step S302), and now the charging circuit 104 (including the voltage conversion circuit 202 and the current sensing circuit 204) is controlled by the control circuit 110 to enter a power saving mode, in this way, a leakage current of the charging apparatus 100 may be reduced (at this moment, the leakage current may be, for example, 25 μA), so as to save power and ensure safety. In detail, when the load RL is not connected to the charging apparatus 100, since the charging circuit 104 does not output the charging voltage V1 at this moment, a voltage of the negative input terminal of the comparator A1 is approximately equal to the reference voltage (for example, 3V, but the disclosure is not limited to this) provided by the reference voltage generating circuit 106 after passing through the resistor R3, and a voltage of the positive input terminal of the comparator A1 is equal to a divided voltage generated by the resistors R1 and R2 after dividing the reference voltage provided by reference voltage generation circuit 106. Namely, the voltage of the negative input terminal of the comparator A1 is greater than the voltage of the positive input terminal of the comparator A1, so that the output terminal of the comparator A1 has a low voltage level (i.e. the detection signal S1 has the low voltage level). The control circuit 110 may determine whether the detection signal S1 is transited to a high voltage level (S304), and when the detection signal S1 output by the comparator A1 has the low voltage level, the control circuit 110 determines that the load RL is not connected to the charging apparatus 100 according to the detection signal S1.

When the load RL is just connected to the charging apparatus 100, the resistor R3 and an equivalent resistance of the load RL may divide the reference voltage provided by the reference voltage generating circuit 106, so that the voltage at the negative input terminal of the comparator A1 is smaller than the voltage at the positive input terminal thereof, and accordingly the detection signal S1 output by the comparator A1 is transited to the high voltage level, and the control circuit 110 may determine that the load RL is connected to the charging apparatus 100 according to the voltage level of the detection signal S1, at this moment, the leakage current of the charging apparatus 100 is slightly increased (the leakage current is, for example, slightly increased to 40 μA).

After the detection signal S1 output by the comparator A1 is transited to the high voltage level, the control circuit 110 is woken up from the ultra-low power state (step S306), and controls the charging circuit 104 to provide the charging voltage V1 (step S308), where the charging voltage V1 may be, for example, 5V, but the disclosure is not limited thereto. During a period that the charging circuit 104 charges the load RL, since the negative input terminal of the comparator A1 directly receives the charging voltage V1 provided by the charging circuit 104, and since the charging voltage V1 causes the diode D1 to enter a cut-off state, the positive input of the comparator A1 receives a divided voltage generated by the resistors R1, R2 and R3 after dividing the charging voltage V1, so that the detection signal S1 output by the comparator A1 is transited to the low voltage level. The control circuit 110 may determine whether the charging of the load RL has completed according to the voltage level of the detection signal S1 and the charging current I1 (step S310). For example, when the charging current I1 is greater than a predetermined current value, the control circuit 110 determines that the load RL has not completed charging, and returns to the step S308 to continue to control the charging circuit 104 to provide the charging voltage V1. When the charging current I1 is smaller than or equal to the predetermined current value, the control circuit 110 determines that the load RL has completed charging, and controls the charging circuit 104 to stop providing the charging voltage V1 (step S312). At this moment, the voltages at the positive and negative input terminals of the comparator A1 are similar to the situation when the load RL is just connected to the charging apparatus 100, and the detection signal output by the comparator A1 is transited to the high voltage level, and the leakage current is similar, which is, for example, about 40 μA.

According to the embodiment of FIG. 2 and FIG. 3, it is learned that not only the charging apparatus 100 may effectively mitigate the disadvantages of excessive volume, high cost, easy damage to mechanical structure, poor waterproof and dustproof effects, the need to add pins, etc., of the conventional charging apparatus, but also the charging apparatus 100 may greatly reduce the leakage current to achieve the power saving effect. For example, in the case that the load RL is a earphone, after the load RL has completed charging, if the charging circuit 104 continues to provide the output voltage V1 (which is, for example, 5V), the leakage current of the charging apparatus 100 and the load RL may reach about 1132 μA (including a leakage current 7 μA of the voltage conversion circuit 202, a leakage current 25 μA of the current sensing circuit 204, a leakage current 100 μA of a current limiter (not shown) of the charging circuit 104, and a leakage current 1 mA of the earphone). If a rechargeable battery used as the power supply 102 has a capacity of 500 mAh, the aforementioned leakage current may consume the capacity of the rechargeable battery after 18 days at most. Since the control circuit 110 of the embodiment of the disclosure may control the charging circuit 104 to stop supplying the charging voltage V1 after determining that the load RL has completed charging, i.e., to turn off an output loop, the time for the power of the rechargeable battery being used up may be extended to 520 days at most, which greatly improves a service time of the rechargeable battery.

Figure 4:
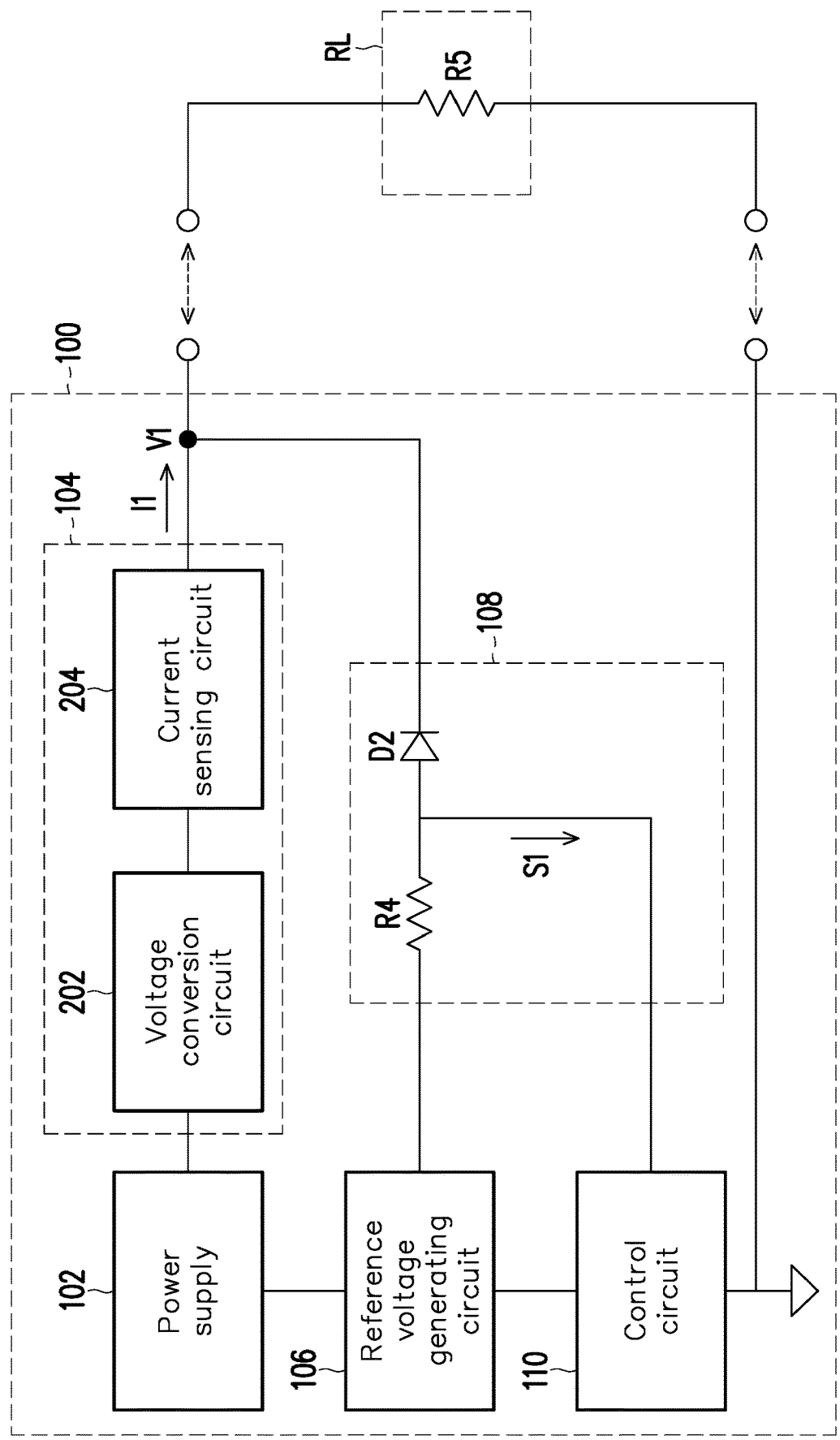
FIG. 4 is a schematic diagram of a charging apparatus according to another embodiment of the disclosure.
Figure 5:
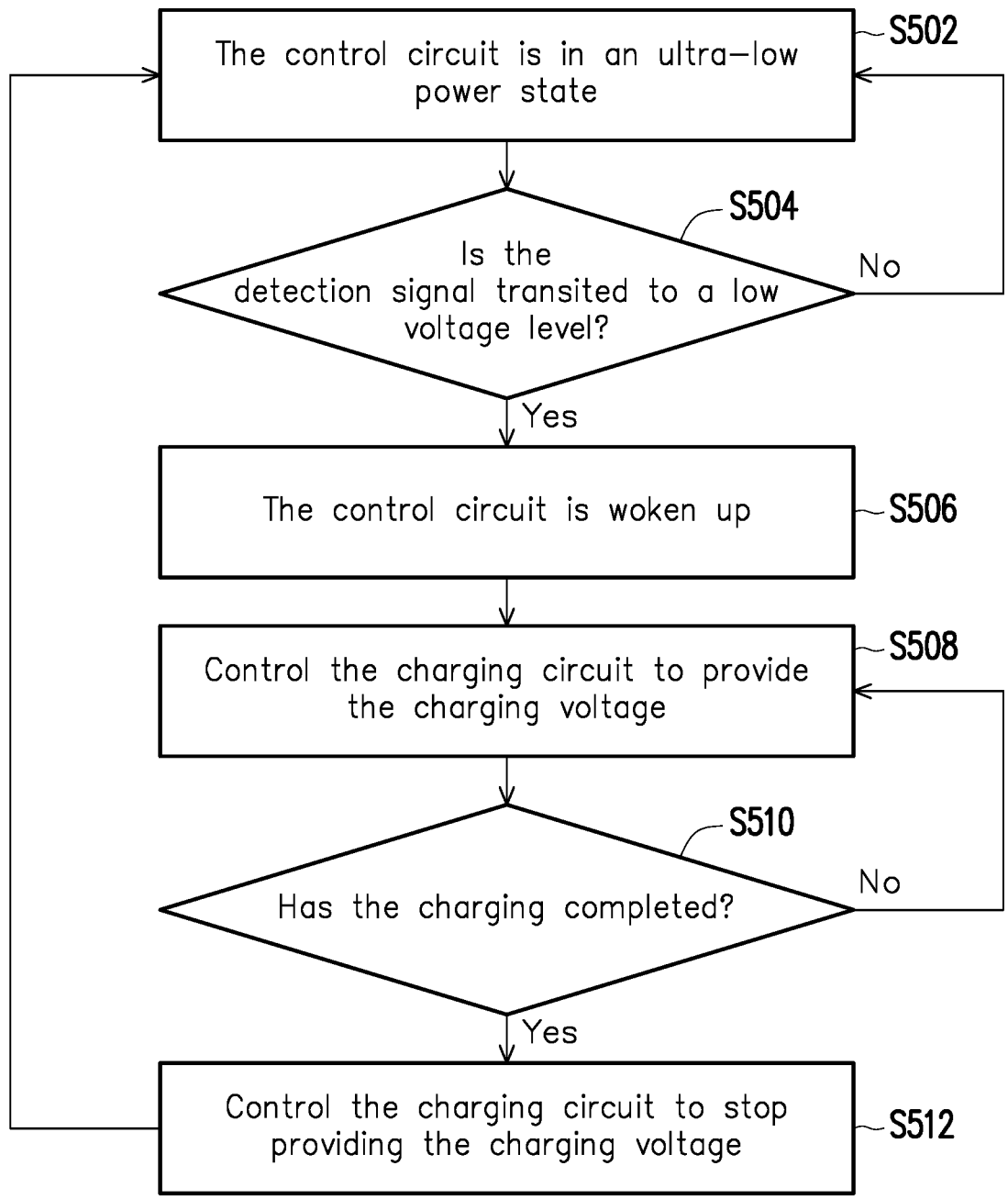
FIG. 5 is a flowchart illustrating charging of the charging apparatus according to another embodiment of the disclosure.

FIG. 4 is a schematic diagram of a charging apparatus according to another embodiment of the disclosure, and FIG. 5 is a flowchart illustrating charging of the charging apparatus according to another embodiment of the disclosure. Referring to FIG. 4 and FIG. 5, in the embodiment of FIG. 4, the detection circuit 108 includes a resistor R4 and a diode D2, where the resistor R4 is coupled between the reference voltage generating circuit 106 and an anode of the diode D2, and a cathode of the diode D2 is coupled to the output terminal of the charging circuit 104. Similar to the embodiment of FIG. 3, when the load RL is not connected to the charging apparatus 100, the control circuit 110 is in the ultra-low power state (step S502), and now the charging circuit 104 is controlled by the control circuit 110 to enter the power saving mode, at this moment, the leakage current of the charging apparatus 100 may be about 5 μA. In detail, since the charging circuit 104 is not connected to the load RL at this moment, the detection signal S1 generated at the common node of the resistor R4 and the diode D2 is in the high voltage level (the voltage value of the detection signal S1 is approximately equal to the reference voltage (for example, 3V) provided by the reference voltage generating circuit 106 after passing through the resistor R4), and the control circuit 110 may determine whether the detection signal S1 is transited to the low voltage level (S504). When the detection signal S1 output by the comparator A1 has the high voltage level, the control circuit 110 determines that the load RL is not connected to the charging apparatus 100 according to the detection signal S1.

When the load RL is just connected to the charging apparatus 100, the resistor R4 and a resistor R5 of the load RL divide the reference voltage provided by the reference voltage generating circuit 106, so that the detection signal S1 is transited to the low voltage level. The control circuit 110 may determine that the load RL has been connected to the charging apparatus 100 according to the voltage level of the detection signal S1, and the leakage current of the charging apparatus 100 is slightly increased at this moment (the leakage current is, for example, slightly increased to 23 μA).

After the detection signal S1 output by the comparator A1 is transited to the low voltage level, the control circuit 110 is woken up from the ultra-low power state (step S506), and controls the charging circuit 104 to provide the charging voltage V1 (step S508), where the charging voltage V1 may be, for example, 5V, but the disclosure is not limited thereto. During the period that the charging circuit 104 charges the load RL, since the charging voltage V1 makes the diode D2 to be in the turn-off state, the voltage value of the detection signal S1 is about equal to the reference voltage provided by the reference voltage generating circuit 106 after passing through the resistor R4, i.e., the detection signal S1 is transited to the high voltage level. The control circuit 110 may determine whether charging of the load RL has completed according to the voltage level of the detection signal S1 and the charging current I1 (step S510). For example, when the charging current I1 is greater than a predetermined current value, the control circuit 110 determines that charging of the load RL is not completed, and returns to the step S508 to continually control the charging circuit 104 to provide the charging voltage V1. When the charging current I1 is smaller than or equal to the predetermined current value, the control circuit 110 determines that the load RL has completed charging, and controls the charging circuit 104 to stop providing the charging voltage V1 (step S512), and at this moment, the leakage current of the charging apparatus 100 is similar to the situation when the load RL is just connected to the charging apparatus 100, which is about 23 μA.

According to the embodiment of FIG. 4 and FIG. 5, it is learned that the components required by the charging apparatus 100 of the embodiment of FIG. 4 and FIG. 5 are fewer, which may further mitigate the disadvantages of excessive volume, high cost, easy damage to mechanical structure, poor waterproof and dustproof effects, the need to add pins, etc., of the conventional charging apparatus, and further reduce the leakage current to achieve better power saving effect. Similar to the embodiment of FIG. 2, in the case that the load RL is a earphone, after the load RL has completed charging, if the charging circuit 104 continues to provide the output voltage V1, the leakage current of the charging apparatus 100 and the load RL may quickly consume the capacity of the rechargeable battery used as the power supply 102. Since the control circuit 110 of the embodiment may also control the charging circuit 104 to stop supplying the charging voltage V1 after determining that the load RL has completed charging, i.e., to turn off the output loop, the time for the power of the rechargeable battery being used up may be extended to 906 days at most, which significantly extends the time for the rechargeable battery running out, so as to improve a service time of the rechargeable battery.

In summary, the detection circuit of the embodiment of the disclosure may provide the detection signal according to the divided voltage on the voltage dividing path between the output terminal of the charging circuit and the output terminal of the reference voltage generating circuit, and the control circuit determines whether the load is connected to the charging apparatus according to the detection signal. In this way, it is unnecessary to use components such as a magnet, a mechanical switch, or an additionally configured pogo pin to detect whether the load is connected to the charging apparatus, so that the disadvantages of the conventional charging apparatus such as excessive volume, high cost, easy damage to the mechanical structure, poor waterproof and dustproof effects and the need to add pins may be mitigated. In some embodiments, the leakage current may be reduced by controlling the charging circuit to stop supplying the charging voltage, so as to achieve the effects of saving power and extending the service time.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A charging apparatus, comprising:
   a power supply;
   a charging circuit, coupled to the power supply, and providing a charging voltage according to the power supply;
   a reference voltage generating circuit, coupled to the power supply, and providing a reference voltage according to the power supply;
   a detection circuit, coupled to the charging circuit and the reference voltage generating circuit, the detection circuit comprising a voltage dividing path located between an output terminal of the charging circuit and an output terminal of the reference voltage generating circuit, and the detection circuit providing a detection signal according to a divided voltage on the voltage dividing path; and
   a control circuit, coupled to the reference voltage generating circuit, the detection circuit and the charging circuit, and determining whether a load is connected to the charging apparatus according to the detection signal and a charging current of the charging circuit.

2. The charging apparatus as claimed in claim 1, wherein the control circuit further determines a charging status of the load according to the charging current of the charging circuit.

3. The charging apparatus as claimed in claim 1, wherein the detection circuit comprises:
   a diode, having an anode coupled to the output terminal of the reference voltage generating circuit;
   a resistor, coupled between a cathode of the diode and the output terminal of the charging circuit;
   a voltage dividing circuit, coupled to a common node of the diode and the resistor, and dividing a voltage on the common node of the diode and the resistor to generate the divided voltage; and
   a comparator, having a positive input terminal and a negative input terminal respectively coupled to an output terminal of the voltage dividing circuit and the output terminal of the charging circuit, and comparing the divided voltage and the charging voltage to generate the detection signal.

4. The charging apparatus as claimed in claim 3, wherein the voltage dividing circuit comprises:
   a first resistor; and
   a second resistor, the second resistor and the first resistor being coupled in series between a ground and the common node of the diode and the resistor, and a common node of the first resistor and the second resistor being coupled to the positive input terminal of the comparator.

5. The charging apparatus as claimed in claim 1, wherein the detection circuit comprises:
   a first resistor, having a first terminal coupled to the reference voltage generating circuit; and
   a diode, having an anode and a cathode respectively coupled to a second terminal of the first resistor and the output terminal of the charging circuit, the load having a second resistor, and a common node of the first resistor and the diode generating the detection signal, wherein when the load is connected to the charging apparatus, the second resistor is coupled between the cathode of the diode and the ground.

6. The charging apparatus as claimed in claim 1, wherein when the control circuit determines that the load is not connected to the charging apparatus according to the detection signal, the control circuit controls the charging circuit to stop outputting the charging voltage.

7. The charging apparatus as claimed in claim 1, wherein when the control circuit determines that the load is connected to the charging apparatus and the load has not completed charging according to the detection signal and the charging current, the control circuit controls the charging circuit to output the charging voltage to charge the load.

8. The charging apparatus as claimed in claim 1, wherein when the control circuit determines that the load is connected to the charging apparatus and the load has completed charging according to the detection signal and the charging current, the control circuit controls the charging circuit to stop outputting the charging voltage.

9. The charging apparatus as claimed in claim 1, wherein the charging circuit comprises:
   a voltage conversion circuit, coupled to the control circuit, and converting a voltage provided by the power supply to generate the charging voltage; and
   a current sensing circuit, coupled to the voltage conversion circuit and the control circuit, sensing the charging current, and transmitting a sensing result to the control circuit.

10. The charging apparatus as claimed in claim 1, wherein the charging voltage is greater than the reference voltage.

* * * * *